United States Patent
Karstens

(10) Patent No.: US 7,953,392 B2
(45) Date of Patent: May 31, 2011

(54) METHOD FOR CONTROLLING AND CALIBRATING ACCESS TO A WIRELESS ACCESS POINT

(75) Inventor: Christopher Kent Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 11/612,820

(22) Filed: Dec. 19, 2006

(65) Prior Publication Data

US 2008/0148360 A1   Jun. 19, 2008

(51) Int. Cl.
- H04M 1/66 (2006.01)
- H04M 1/68 (2006.01)
- H04M 3/16 (2006.01)
- H04W 4/00 (2009.01)

(52) U.S. Cl. .................. 455/411; 455/410; 455/435.1

(58) Field of Classification Search .............. 370/252; 455/41.2, 410, 435.1, 435.2, 436, 443, 411; 726/29

See application file for complete search history.

(56) References Cited

U.S. PATENT DOCUMENTS

| | | | |
|---|---|---|---|
| 5,289,527 A * | 2/1994 | Tiedemann, Jr. | 455/435.1 |
| 5,945,949 A | 8/1999 | Yun | |
| 6,414,635 B1 * | 7/2002 | Stewart et al. | 342/457 |
| 6,493,539 B1 | 12/2002 | Falco et al. | |
| 6,961,560 B2 | 11/2005 | Hermann et al. | |
| 2002/0164996 A1 | 11/2002 | Dorenbosch | |
| 2004/0166875 A1 * | 8/2004 | Jenkins et al. | 455/456.1 |
| 2005/0003814 A1 * | 1/2005 | Saito et al. | 455/435.1 |
| 2005/0037756 A1 * | 2/2005 | Yaguchi et al. | 455/436 |
| 2005/0058081 A1 | 3/2005 | Elliott | |
| 2005/0114647 A1 * | 5/2005 | Epstein | 713/153 |
| 2005/0262022 A1 * | 11/2005 | Oliveira et al. | 705/51 |
| 2005/0287950 A1 | 12/2005 | Helden et al. | |
| 2006/0229018 A1 * | 10/2006 | Mlinarsky et al. | 455/67.11 |

FOREIGN PATENT DOCUMENTS

| | | |
|---|---|---|
| EP | 0948222 A2 * | 10/1999 |
| WO | 2005091573 A1 | 9/2005 |

OTHER PUBLICATIONS

Skoog et al., "Nanosecond-Level Precision Timing Comes to Military Applications", Cots Journal, pp. 1-6, retrieved May 8, 2006 http://www.cotsjournalonline.com/home/article.php?id=100410&pg=2.

* cited by examiner

*Primary Examiner* — Nick Corsaro
*Assistant Examiner* — Edd Rianne Plata
(74) *Attorney, Agent, or Firm* — Yee & Associates, P.C.; Steven L. Bennett

(57) ABSTRACT

A computer implemented method and computer program product for controlling a wireless access point range. In one embodiment, the process identifies a distance between the client device and the wireless access point in response to a request by a client device to access the wireless access point. The process allows the client device to access the wireless access point if the distance from the client device to the wireless access point is within the selected access range for the wireless access point.

11 Claims, 10 Drawing Sheets

METHOD FOR CONTROLLING AND CALIBRATING ACCESS TO A WIRELESS ACCESS POINT

BACKGROUND OF THE INVENTION

1. Field of the Invention

The present invention is related generally to a data processing system and in particular to a method and apparatus for a wireless access point. More particularly, the present invention is directed to a computer implemented method, apparatus, and computer usable program code for controlling and calibrating a wireless access point range.

2. Description of the Related Art

Wireless networking technology enables users to access networks, such as the Internet, from wireless hand held computing devices. Wireless hand held computing devices include, but are not limited to, laptop computers, tablet PCs, personal digital assistants (PDAs), and cellular telephones.

A wireless access point (WAP) is a device that provides access to a wireless network, such as a router. A client device, such as a laptop or PDA, that wants to access the wireless network, requests access from the wireless access point. The wireless access range is the range within which a wireless access point can provide a client with access to a wireless network. In other words, access range is the number of feet from an access point within which a wireless network adapter on a client device can see the wireless access point.

Wireless technology is improving very rapidly. Current wireless access points can support a wireless access range of approximately four hundred and ten feet (410 ft) indoors and one thousand eight hundred seventy feet (1,870 ft) outdoors under 802.11 standard wireless access protocols. However, if a client device is outside the wireless access range of the wireless access point, the client device will not be able to access the network through that particular wireless access point without moving into the wireless access range.

A wireless access point can provide open access to client devices. Open access provides access to all requesting client devices within the access range of the wireless access point without requiring a user authentication. However, when a wireless access point is not configured to provide open access, requesting client devices must go through an identification or authentication process to confirm that the user is authorized to obtain access to the network before the wireless access point will grant network access to the client.

Typically, a user or client authentication procedure involves a requesting client providing a user name and password. However, other authentication methods can be used including, but not limited to, an IP address of the requesting client, a private key or public key, a digital signature, a finger print, voice print, retina scan, any other biometric, or any other means for determining whether a user is an authorized user.

Frequently, wireless access point owners want to provide open access to persons on their property. For example, coffee shops, hotels, airports, restaurants, and colleges generally have open access points to draw in customers and students. In another example, a homeowner may have open access points within a home because the owner wants to provide access to friends, family, and house guests without having to deal with reconfiguring security settings on the access point and/or on the client devices trying to connect to the wireless network.

However, wireless access points frequently provide a wireless access range that overlaps onto adjacent or nearby property, allowing users located off of the owner's property to utilize the wireless access point. Using current methods, a wireless access point owner cannot readily control the range of open access. Therefore, users may be unable to avoid providing open access to client devices not located on the wireless access point owner's property. Because users cannot readily adjust wireless access point range, they must implement security settings requiring user and/or hardware authentication to control access to their networks. This method can be inconvenient and burdensome to users.

SUMMARY OF THE INVENTION

The illustrative embodiments provide a computer implemented method, apparatus, and computer usable program code for managing access to a wireless access point range. In one embodiment, the process identifies a distance between the client device and the wireless access point in response to a request by a client device to access the wireless access point. The process allows the client device to access the wireless access point if the distance from the client device to the wireless access point is within the selected access range for the wireless access point.

In another embodiment, the illustrative embodiments provide a method for calibrating a wireless access range. The process sends a data packet to a calibration client with a given time-to-live value. In response to receiving a response from the client, the process adds the given time-to-live value to a set of desired time-to-live values. Next, the process selects a largest time-to-live value from the set of desired time-to-live values to form a selected time-to-live value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
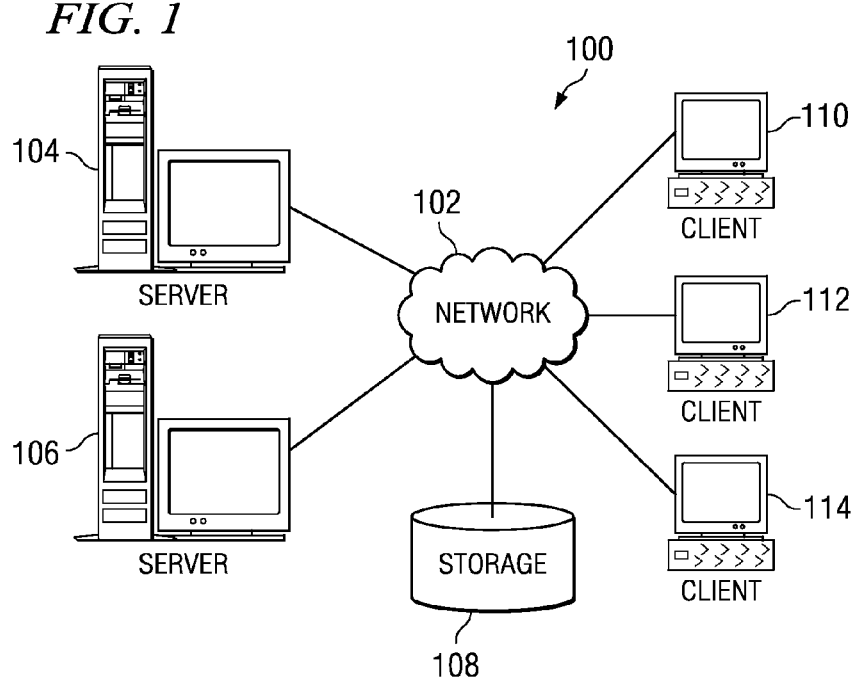
FIG. 1 is a pictorial representation of a network of data processing systems in which illustrative embodiments may be implemented.
Figure 2:
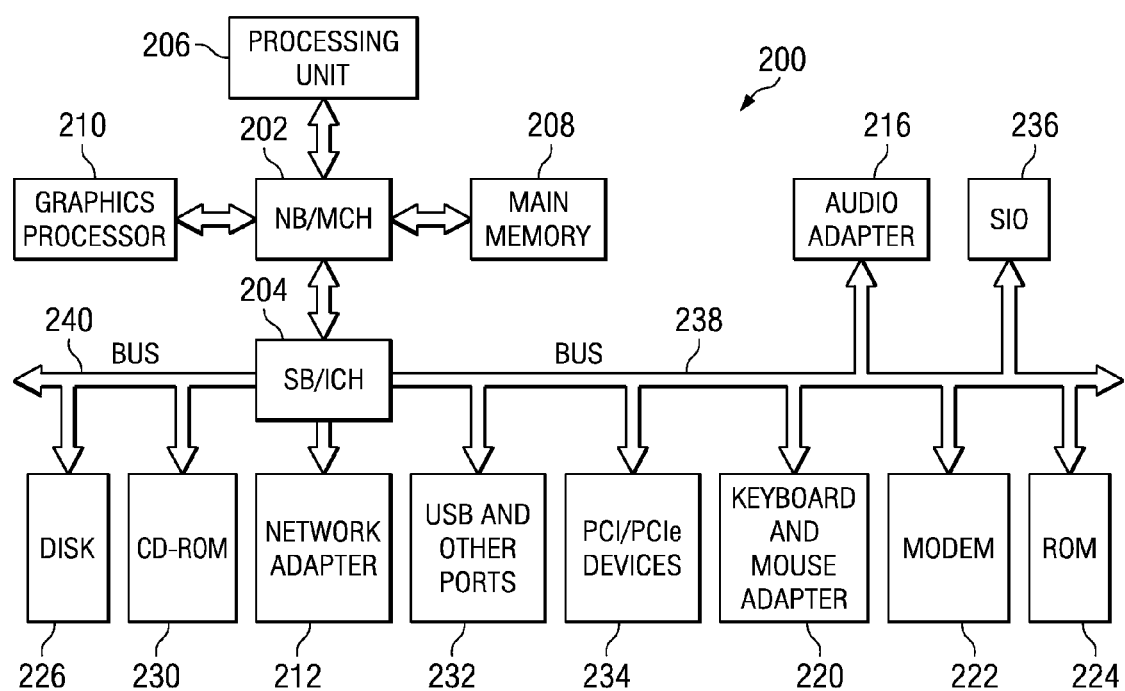
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
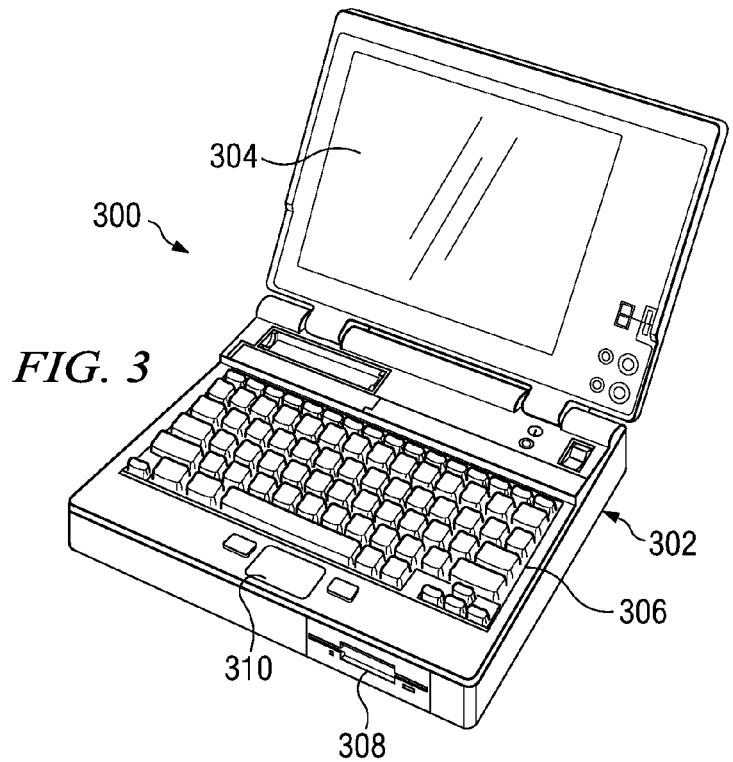
FIG. 3 is a pictorial representation of a mobile computing device in which illustrative embodiments may be implemented in accordance with an illustrative embodiment.

With reference now to FIG. 3, a pictorial representation of a mobile computing device in which the present invention may be implemented is depicted in accordance with a preferred embodiment of the present invention. A mobile computing device is a computing device that is compact enough to be held in one or two human hands. For example, a mobile computing device includes cellular phones, tablet computers, smart watches, personal navigation devices, and personal digital assistants, also known as PDAs and palmtops.

Mobile computer 300 is depicted which includes system unit 302, video display terminal 304, keyboard 306, storage devices 308, which may include floppy drives and other types of permanent and removable storage media, and pointer device 310. Additional input devices may be included with mobile computer 300, such as, for example, a mouse, joystick, touch screen, trackball, microphone, and the like. Mobile computer 300 may be implemented using any suitable computer, such as an IBM Thinkpad computer, which is a product of International Business Machines Corporation, located in Armonk, N.Y. Mobile computer 300 also preferably includes a graphical user interface (GUI) that may be implemented by means of systems software residing in computer readable media in operation within computer 300.

In accordance with the aspects of the present invention, mobile computer 300 can include a laptop computer, a tablet computer, a cellular telephone, a personal digital assistant (also known as PDAs or palmtops), a personal navigator, and any other known or available mobile computing device.

Figure 4:
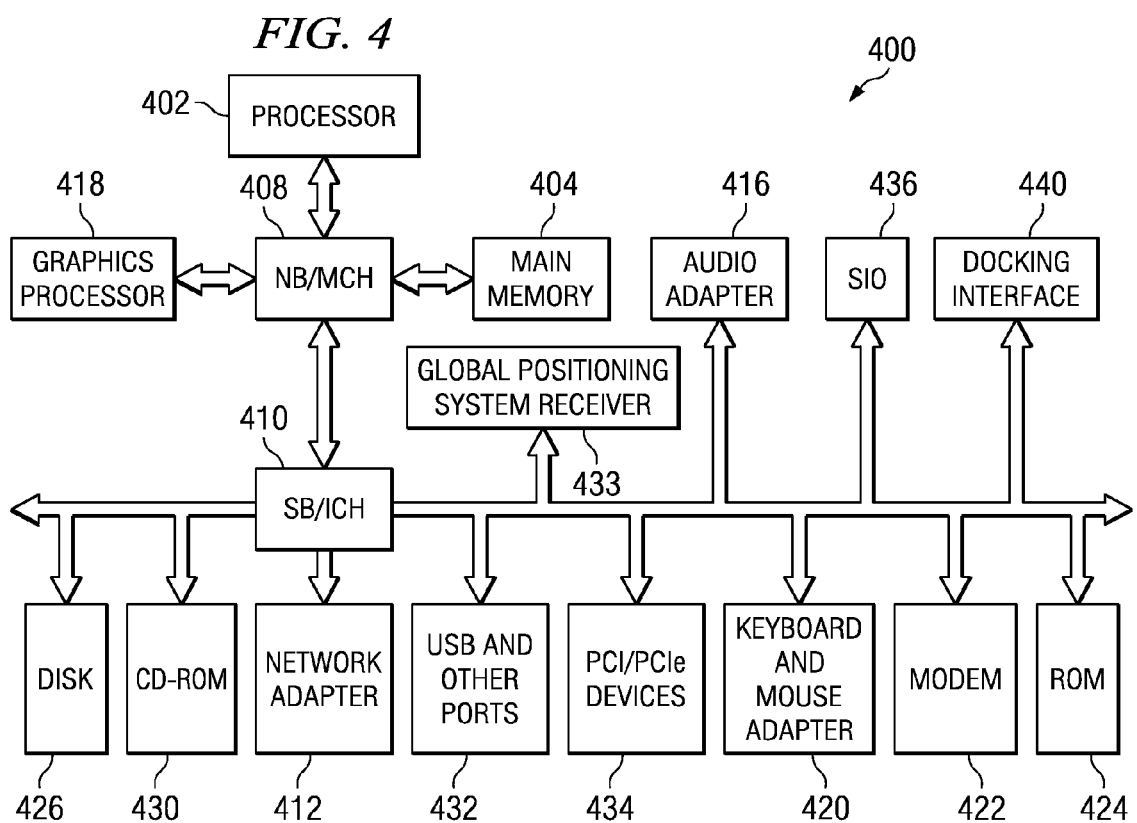
FIG. 4 is a block diagram of a laptop data processing system in which illustrative embodiments may be implemented in accordance with an illustrative embodiment.

Turning now to FIG. 4, a block diagram of a laptop data processing system is shown in which the present invention may be implemented. Data processing system 400 is an example of a mobile computing device, such as mobile computer 300 in FIG. 3, in which code or instructions implementing the processes of the present invention may be located. In the depicted example, data processing system 400 employs a hub architecture including a north bridge and memory controller hub (MCH) 408 and a south bridge and input/output (I/O) controller hub (ICH) 410. Processor 402, main memory 404, and graphics processor 418 are connected to MCH 408. Graphics processor 418 may be connected to the MCH through an accelerated graphics port (AGP), for example.

In the depicted example, network adapter 412, audio adapter 416, keyboard and mouse adapter 420, modem 422, read only memory (ROM) 424, hard disk drive (HDD) 426, CD-ROM drive 430, universal serial bus (USB) ports and other communications ports 432, a global positioning system (GPS) receiver 433, and PCI/PCIe devices 434 may be connected to ICH 410.

PCI/PCIe devices may include, for example, Ethernet adapters, add-in cards, PC cards for notebook computers, etc. PCI may use a cardbus controller, while PCIe does not. ROM 424 may be, for example, a flash binary input/output system (BIOS). Hard disk drive 426 and CD-ROM drive 430 may use, for example, an integrated drive electronics (IDE) or serial advanced technology attachment (SATA) interface. A super I/O (SIO) device 436 may be connected to ICH 410.

Global positioning system receiver 433 receives data from various satellites. Global positioning system receiver 433 determines the latitude and longitude of global positioning system receiver 433 based upon the difference in time of reception for signals received from different global positioning system satellites.

Data processing system 400 may be a mobile computing device, such as a laptop computer or hand held computer, such as a personal digital assistant, cellular telephone, or tablet computer. Docking interface 440 may also be connected to the ICH 410. Docking interface 440 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 402 and is used to coordinate and provide control of various components within data processing system 400 in FIG. 4. The operating system may be a commercially available operating system such as Windows XP, which is available from Microsoft Corporation. An object oriented programming system such as Java® may run in conjunction with the operating system and provides calls to the operating system from Java® programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402. The processes of the present invention are performed by processor 402 using computer implemented instructions, which may be located in a memory such as, for example, main memory 404, flash BIOS memory 424, or in one or more peripheral devices 426 and 430.

Network adapter 412 is a network adapter for accessing a wireless network. In one embodiment, network adapter 412 utilizes wireless application protocol to enable data process system 400 to access wireless networks. A wireless access point links a wireless network with a computer network, such as network 102 in FIG. 1. The wireless access point enables a user at a mobile computing device to access data on the computer network through the wireless network.

Those of ordinary skill in the art will appreciate that the hardware in FIG. 4 may vary depending upon the implementation. Other internal hardware or peripheral devices, such as flash memory, equivalent nonvolatile memory, or optical disk drives and the like, may be used in addition to or in place of the hardware depicted in FIG. 4. Also, the processes of the present invention may be applied to a multiprocessor data processing system.

For example, data processing system 400 may be a personal digital assistant (PDA), which is configured with flash memory to provide non-volatile memory for storing operating system files and/or user-generated data. The depicted example in FIG. 4 and above-described examples are not meant to imply architectural limitations. For example, data processing system 400 also may be a tablet computer, personal navigation device, or telephone device in addition to taking the form of a PDA.

Figure 5:
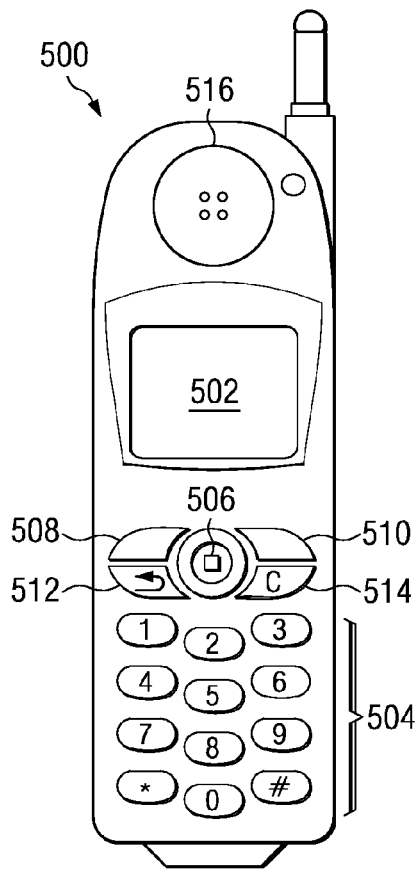
FIG. 5 depicts a mobile telephone in which illustrative embodiments may be implemented in accordance with an illustrative embodiment.

FIG. 5 is a mobile telephone in which the present invention may be implemented. Mobile phone 500 includes screen 502, which is capable of displaying pictures and text. Additionally, mobile phone 500 also includes numeric keypad 504, joystick 506, and buttons 508, 510, 512, and 514 placed around the joystick 506. These buttons are used to initiate various functions in mobile phone 500. These functions include, for example, activating a menu, displaying a calendar or task list, or initiating a call. Mobile phone 500 can also include camera 516, which may be used to take pictures or videos depending upon the implementation.

In addition, mobile phone 500 includes a global positioning system receiver for determining a position of mobile phone 500 on the Earth's surface by comparing data received from various satellites by the global positioning system receiver.

Figure 6:
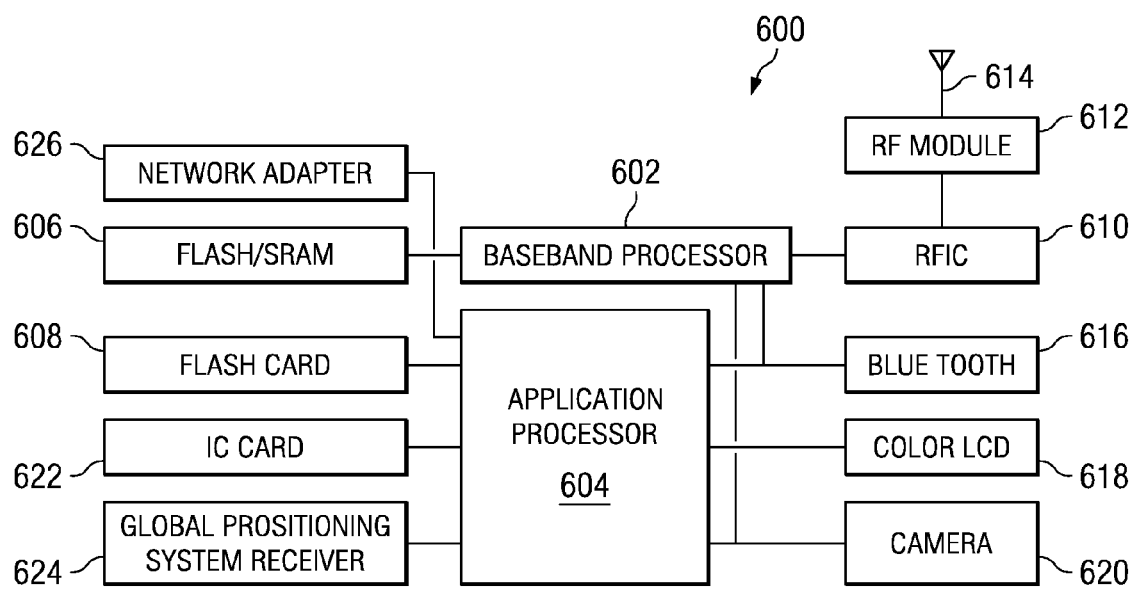
FIG. 6 is a block diagram of a camera phone in which illustrative embodiments may be implemented in accordance with an illustrative embodiment.

With reference now to FIG. 6, a block diagram of a camera phone is depicted in accordance with a preferred embodiment of the present invention. Camera phone 600 includes baseband processor 602, application processor 604, flash/static random access memory (SRAM) 606, flash card 608, radio frequency integrated circuit (RFIC) 610, radio frequency (RF) module 612, antenna 614, Blue Tooth unit 616, color liquid crystal display (LCD) 618, camera 620, IC card 622, global positioning system receiver 624, and network adapter 626.

Baseband processor 602 provides for receiver and transmitter operations and is also referred to as a transceiver. In particular, baseband processor 602 handles all audio, signal, and data processing needed to receive and send data using RF transmissions or Blue Tooth transmissions. Application processor 604 provides the processing power for other functions within camera phone 600. For example, calculators, calendars, alarms, camera functions, and directories are provided through application processor 604. Flash/SRAM 606 is a storage device in which various instructions for providing the functions within camera phone 600 are located and provide upgrades. Flash card 608 is a storage device in which user data and applications may be stored. An example of flash card 608 is a secure digital card.

A pathway for the transmission of voice and other types of data is through RFIC 610. Additionally, short range transmissions may be sent or received through Blue Tooth unit 616. Blue Tooth unit 616 conforms to Blue Tooth wireless specification, which defines the link layer and the application layer for product developers. Both of these transmissions are made through antenna 614 in this illustrative example.

Color LCD 618 provides a display for pictures and other data for camera phone 600. Camera 620, in this example, is a complementary metal oxide semiconductor (CMOS) camera which may be built into camera phone 600 or connected to camera phone 600 as a module, such as IC card 622. IC card 622 also may contain other application specific functions, such as a modem or additional memory.

Global positioning system receiver 624 receives data from various satellites. Global positioning system receiver 624 determines the latitude and longitude of global positioning system receiver 624 by calculating the time taken for each satellite signal to reach global positioning system receiver 624. Based on the difference in time of reception for signals received from different satellites, global positioning system receiver 624 is able to determine the position of global positioning system receiver 624.

Network adapter 626 is a network adapter for accessing a wireless network. In one embodiment, network adapter 626 utilizes wireless application protocols to enable mobile phone 600 to access wireless networks.

Figure 7:
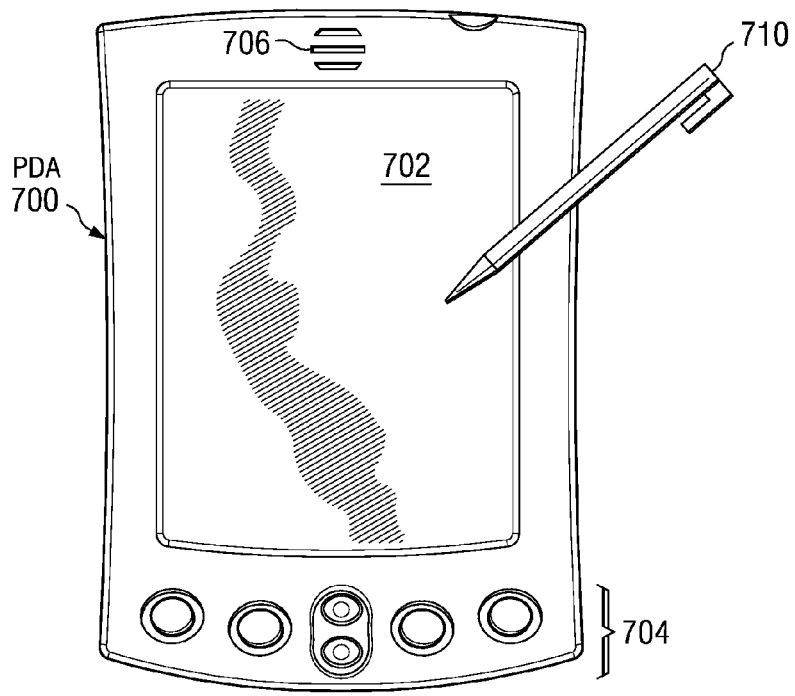
FIG. 7 is a diagram of a client in the form of a personal digital assistant in which illustrative embodiments may be implemented.

Turning now to FIG. 7, a diagram of a client in the form of a personal digital assistant (PDA) is depicted in accordance with a preferred embodiment of the present invention. PDA 700 includes a display 702 for presenting textual and graphical information. Display 702 may be a known display device, such as a liquid crystal display (LCD) device. The display may be used to present a map or directions, calendar information, a telephone directory, or an electronic mail message. In these examples, screen 702 may receive user input using an input device such as, for example, stylus 710.

PDA 700 may also include keypad 704 and speaker 706. PDA 700 may also include an antenna that is internal to PDA 700. Keypad 704 may be used to receive user input in addition to using screen 702. Speaker 706 provides a mechanism for audio output, such as presentation of an audio file. The internal antenna provides a mechanism used in establishing a wireless communications link between PDA 700 and a network and/or global positioning system satellites. PDA 700 also preferably includes a graphical user interface that may be implemented by means of systems software residing in computer readable media in operation within PDA 700.

Figure 8:
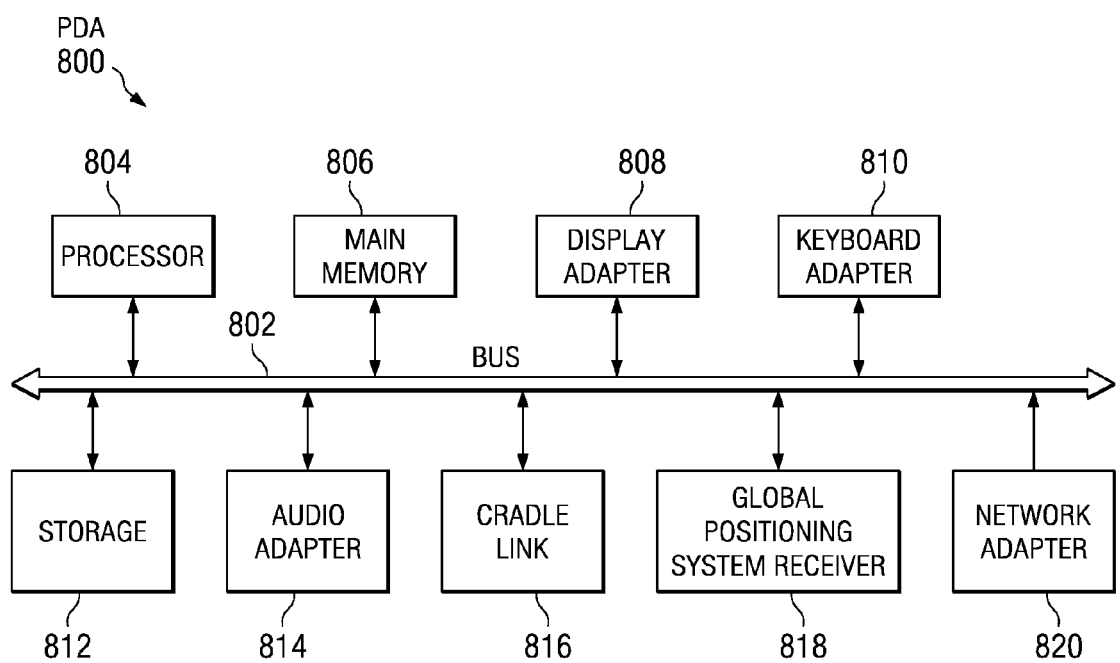
FIG. 8 is a block diagram of a personal digital assistant in which illustrative embodiments may be implemented.

With reference now to FIG. 8, a block diagram of a PDA is shown in accordance with a preferred embodiment of the present invention. PDA 800 is an example of a PDA, such as PDA 800 in FIG. 8, in which code or instructions implementing the processes of the present invention may be located. PDA 800 includes a bus 802 to which processor 804 and main memory 806 are connected. Display adapter 808, keypad adapter 810, storage 812, audio adapter 814, and global positioning system receiver 818 also are connected to bus 802. Cradle link 816 provides a mechanism to connect PDA 800 to a cradle used in synchronizing data in PDA 800 with another data processing system. Further, display adapter 808 also includes a mechanism to receive user input from a stylus when a touch screen display is employed.

Global positioning system receiver 818 receives signals from various satellites. Global positioning system receiver 818 determines the latitude and longitude of receiver 818 based upon the difference in time of reception of the signals from the different satellites.

An operating system runs on processor 804 and is used to coordinate and provide control of various components within PDA 800. The operating system may be, for example, a commercially available operating system such as Windows CE, which is available from Microsoft Corporation. Instructions for the operating system and applications or programs are located on storage devices, such as storage 812, and may be loaded into main memory 806 for execution by processor 804.

Network adapter 820 is a network adapter for accessing a wireless network. In one embodiment, network adapter 820 utilizes wireless application protocol to enable PDA 800 to access wireless networks. Wireless access point links a wireless network with a computer network, such as network 102 in FIG. 1. The wireless access point enables a user at a mobile computing device to access data on the computer network through the wireless network.

Those of ordinary skill in the art will appreciate that the hardware in FIG. 8 may vary depending upon the implementation. Other internal hardware or peripheral devices, such as flash ROM (or equivalent nonvolatile memory) or optical disk drives and the like, may be used in addition to or in place of the hardware depicted in FIG. 8.

Figure 9:
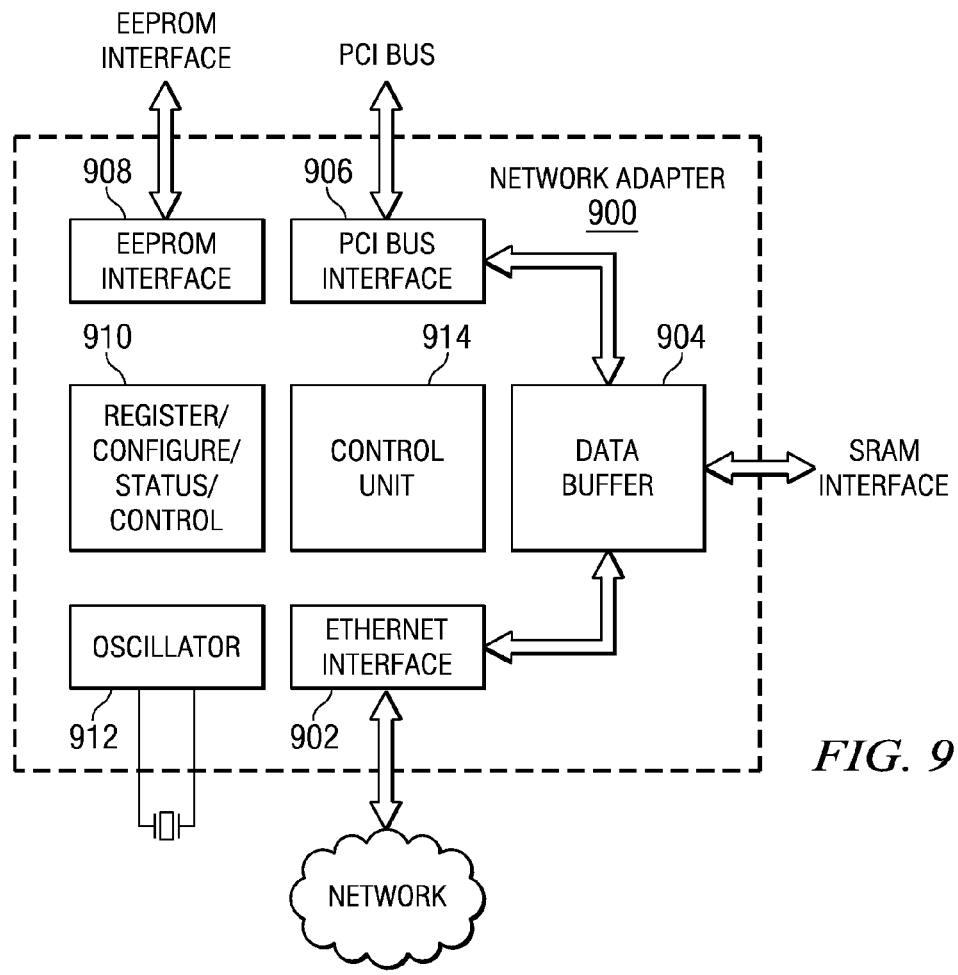
FIG. 9 is a block diagram of a network adapter in which illustrative embodiments may be implemented.

FIG. 9 is a block diagram of a network adapter in which illustrative embodiments may be implemented in accordance with an illustrative embodiment. Network adapter 900 may be implemented as network adapter 212 in FIG. 2, network adapter 412 in FIG. 4, network adapter 626 in FIG. 6, or network adapter 820 in FIG. 8.

As shown, network adapter 900 includes Ethernet interface 902, data buffer 904, and PCI bus interface 906. These three components provide a path between the network and the bus of the data processing system. Ethernet interface 902 provides an interface to the network connected to the data processing system. PCI bus interface 906 provides an interface to a bus, such as bus 238 in FIG. 2. Data buffer 904 is used to store data being transmitted and received through network adaptor 900. This data buffer also includes a connection to an SRAM interface to provide for additional storage.

Network adaptor 900 also includes electrically erasable programmable read-only memory (EEPROM) interface 908, register/configure/status/control unit 910, oscillator 912, and control unit 914. EEPROM interface 908 provides an interface to an EEPROM chip, which may contain instructions and other configuration information for network adaptor 900. Different parameters and setting may be stored on an EEPROM chip through EEPROM interface 908. Register/configure/status/control unit 910 provides a place to store information used to configure and run processes on network adaptor 900. For example, a timer value for a timer may be stored within these registers. Additionally, status information for different processes also may be stored within this unit. Oscillator 912 provides a clock signal for executing processes on network adaptor 900.

Control unit 914 controls the different processes and functions performed by network adaptor 900. Control unit 914 may take various forms. For example, control unit 914 may be a processor or an application-specific integrated chip (ASIC). In these examples, the processes of the present invention used to manage flow control of data are executed by control unit 914. If implemented as a processor, the instructions for these processes may be stored in a chip accessed through EEPROM interface 908.

Data is received in receive operations through Ethernet interface 902. This data is stored in data buffer 904 for transfer onto the data processing system across PCI bus interface 906. For example, the data may be transferred onto a bus, such as PCI local bus 206 in FIG. 2.

Frequently, wireless access point owners want to provide open access to persons on their property but not to persons located off of their property. For example, a coffee shop owner may want to provide open access to customers inside the shop, but not to customers outside or in adjacent shops. In another example, a homeowner may want to provide open wireless access only to certain spots on their property and not to every neighbor's property within a two block radius of the homeowner's wireless access point. However, wireless access points cannot readily control the range of open access for a given wireless access point. Therefore, current wireless access points frequently provide access to people located away from the property owned or controlled by the wireless access point owner.

Figure 10:
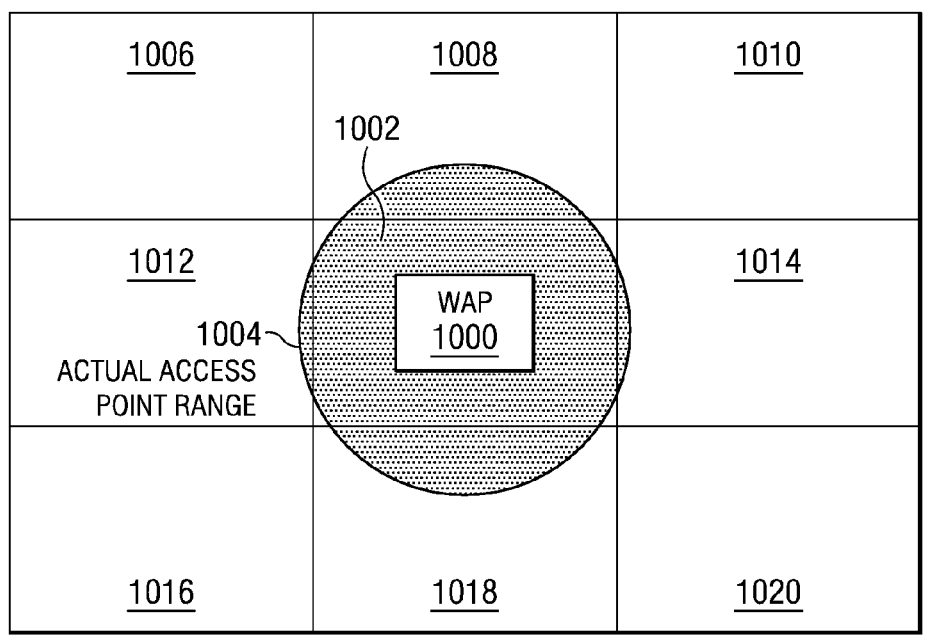
FIG. 10 is a block diagram illustrating a wireless access point range in a currently used wireless access point.

FIG. 10 is a block diagram illustrating a wireless access point range in a currently used wireless access point. Wireless access point (WAP) 1000 is a device that acts as a communications hub for users of wireless client computing devices requesting access to a network, such as a local area network (LAN) or the Internet. Wireless access point 1000 is located on property 1002. Wireless access point 1000 has an actual access point range 1004 shown by the shaded circle. In this example, wireless access point 1000 provides open access. Therefore, any client computing device within actual access point range 1004 can utilize wireless access point 1000 to access the network.

In this example, actual access point range 1004 extends over properties 1006-1020 that are not owned or controlled by the owner of property 1002. Therefore, any client computing device within actual access point range 1004 on adjacent properties 1006-1020 can utilize wireless access point 1000 to access the network if wireless access point 1000 is configured for open access.

The illustrative embodiments recognize that an owner of a wireless access point may be unable to provide open access to some selected areas of the owner's property and not to other areas of the owner's property and/or adjacent properties using current wireless access points and Internet service providers.

The illustrative embodiments recognize that this use of a wireless access point's open access by client computing devices in surrounding adjacent properties consumes wireless network bandwidth and can slow down the wireless access point owner's network function. In addition, the owner may negate the advantage of providing open access in a shop or store located on property if customers are able to access the owners wireless access point from a nearby competitor's shop or store.

The illustrative embodiments also recognize that current wireless access points and Internet service providers do not provide a means for readily limiting or adjusting an open access range to a range selected by a user. Therefore, the illustrative embodiments provide a computer implemented method, apparatus, and computer usable program code for managing access to a wireless access point range.

In one embodiment, the process identifies a distance between the client device and the wireless access point in response to a request by a client device to access the wireless access point. The process allows the client device to access the wireless access point if the distance from the client device to the wireless access point is within the selected access range for the wireless access point.

In another embodiment, the illustrative embodiments provide a method for calibrating a wireless access range. The process sends a data packet from the wireless access point to a calibration client with a given time-to-live value and a request for a response. In response to receiving a response from the client, the process adds the given time-to-live value to a set of desired time-to-live values. Next, the process selects a largest time-to-live value from the set of desired time-to-live values to form a selected time-to-live value.

Figure 11:
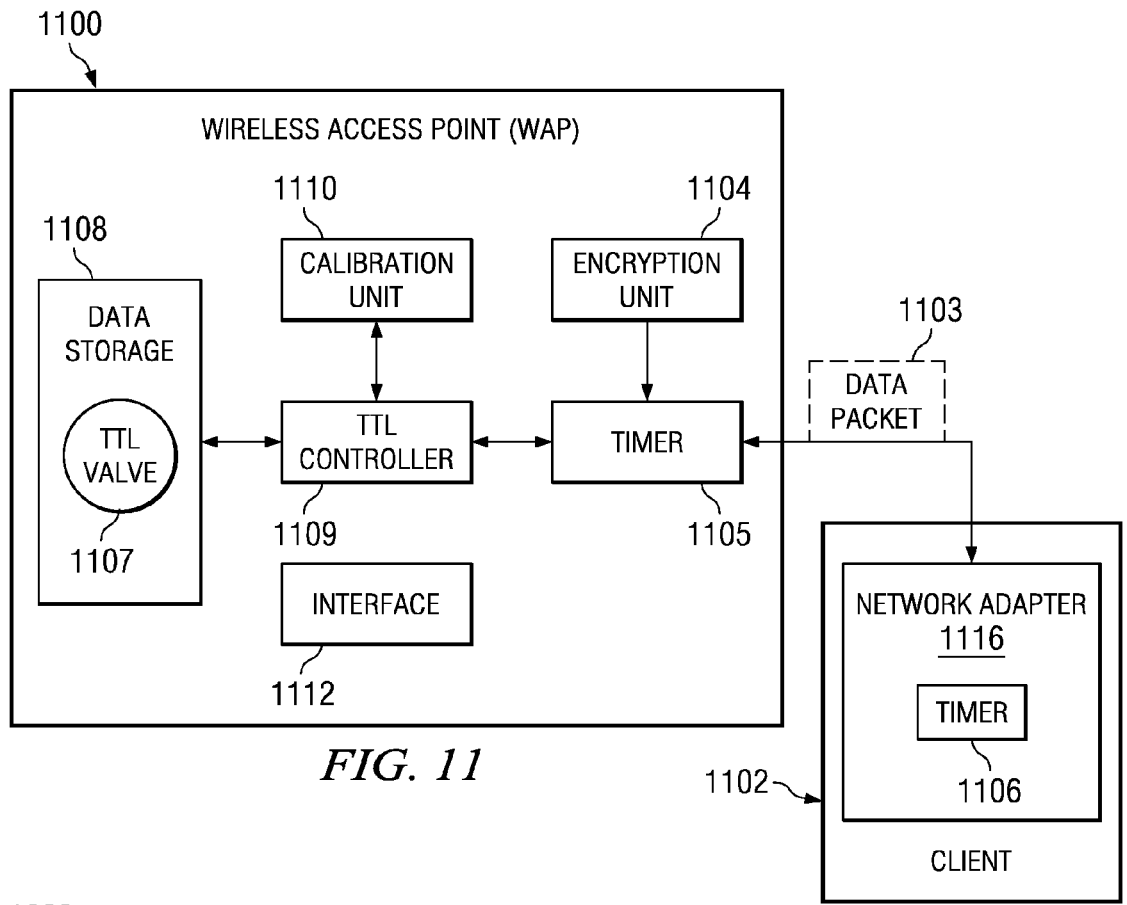
FIG. 11 is a block diagram illustrating a data flow between a wireless access point and a client computing device for controlling and calibrating an open access point range in accordance with an illustrative embodiment.

FIG. 11 is a block diagram illustrating a data flow between a wireless access point and a client computing device for controlling and calibrating an open access point range in accordance with an illustrative embodiment. Wireless access point (WAP) 1100 is a device that acts as a communications hub for client computing devices connecting to a network, such as a LAN or the Internet. For example, wireless access point 1100 can be a network router.

Client 1102 is any known or available client computing device, including but not limited to, a desktop computer, a laptop computer, a personal digital assistant (PDA), a notebook computer, a cell phone, a smart watch, and/or any other device to enable a user to access a network. Client 1102 may be implemented using any type of computing device, such as a personal computer, laptop, personal digital assistant, or any other computing device depicted in FIGS. 1-8. In this example, client 1102 is a mobile computing device, such as mobile computer 300 in FIG. 3, mobile phone 500 in FIG. 5, or PDA 700 in FIG. 7.

Client 1102 sends a data packet, such as data 1103, to wireless access point 1100 to request access to a wireless network. Data 1103 can include a request for access to a wireless network, a grant of access to a wireless network, an acknowledge, a synchronization signal, a sync-acknowledge signal, or any other digital data, global positioning system satellite signal, or radio wave transmission sent or received by wireless access point 1100 and/or client 1102.

Encryption unit 1104 is a hardware and/or software component for encrypting data 1103 transmitted from wireless access point 1100 to client 1102 and decrypting data 1103 received by wireless access point 1100 from client 1102. In this example, encryption unit 1104 encrypts timing data used to measure and validate a distance between wireless access point 1100 and client 1102.

Timing data is data that includes a precise nanosecond-level clock time and/or an amount of time between a send clock time and a retrieve clock time. Timing data is used to determine whether to grant a requesting client access to the wireless network.

If a hacker is able to obtain access to unencrypted timing data, the hacker may be able to obtain unauthorized access to the network by falsifying an "in-range" response to wireless access point 1100. Thus, timing data is encrypted so that a hacker will not be able to see timing information in the clear. Thus, encryption unit 1104 encrypts timing data transmitted to client 1102 to prevent an unauthorized or malicious user from obtaining access to timing data. Encryption unit 1104 encrypts timing data using any known or available method for encrypting data and/or encrypting radio wave signals. Although not shown, client 1102 also includes an encryption unit for encrypting and de-encrypting data, such as timing data.

In one embodiment, encryption unit 1104 encodes or scrambles timing information used to validate distance between wireless access point 1100 and client 1102 by transmitting timing information through multiple different radio frequencies. For example, timing information can be encrypted using digital spread spectrum and/or digital transmission. Digital spread spectrum is a method in which a signal generated at a single radio frequency is deliberately spread over a wide band of frequencies to prevent detection or jamming.

An example of digital spread spectrum is frequency hopping. In frequency hopping, a signal is sent over a carrier wave that is rapidly switched among many frequency channels in a sequence known to both the sender of the signal and the receiver of the signal.

Timer 1105 is a hardware and/or software device for maintaining a current time. In other words, timer 1105 performs a clock function. Timers 1105 and 1106 are used to measure a distance between wireless access point 1100 and client 1102. Timer 1105 on wireless access point 1100 is synchronized with timer 1106 on client 1102 to ensure accurate time recording when a data packet is sent from wireless access point 1100 to client 1102 and when a data packet is received by wireless access point 1100 from client 1102.

In this example, timers 1105 and 1106 are high resolution timers for measuring radio wave distance between wireless access point 1100 and client 1102. Radio waves are electromagnetic energy. Radio waves travel at the speed of light, which is approximately 186,000 miles per second in a vacuum. Timer 1105 can determine how far a radio signal from client 1102 has traveled by timing an amount of time required for a signal sent by client 1102 to arrive at wireless access point 1100. Likewise, timer 1106 can determine a distance between client 1102 and wireless access point 1100 by measuring an amount of time required for a signal sent by wireless access point 1100 to arrive at client 1102. This timing calculation is accomplished in these illustrative examples by time stamping a radio wave transmission or data packet when the radio wave transmission or data packet is sent and time stamping a data packet with a precise clock time when the data packet was received. The timing calculation may also be performed by time stamping an Internet protocol (IP) data package rather than time stamping a radio wave transmission. In addition, time stamping may be performed by a hardware component, a software component, or by any combination of hardware and software components.

Thus, for example, when client 1102 sends data 1103 to wireless access point 1100, timer 1106 adds an exact time that data 1103 was transmitted to the data packet. In other words, timer 1106 includes an exact time in the data packet indicating when the data packet was sent from client 1102. When wireless access point 1100 receives data 1103, timer 1105 records the exact clock time that data 1103 was received. Timer 1105 can determine a distance between client 1102 and wireless access point 1100 based on the speed of a radio wave transmission and the amount of time it took data 1103 to arrive at wireless access point 1100. In order to make an accurate determination of the distance between wireless access point 1100 and client 1102, timers 1105 and 1106 are synchronized down to the nanosecond in these examples.

In one embodiment, timer 1105 includes a master clock that periodically broadcasts a sync message based on its local clock to enable timer 1105 to make a precise measurement of exactly when the sync message was sent. Timer 1105 sends a follow up sync package that contains the exact local clock time of timer 1105 when the sync package was sent. Timer 1106 uses the time in the follow up sync package to determine when the sync message was sent. Timer 1106 makes a precise measurement of exactly when the sync message was received the time when the sync package was sent by timer 1105 to determine a distance between wireless access point 1100 and client 1102. In one example, timer 1105 sends a sync message and a follow up sync package at regular intervals. For example, timer 1105 may send a sync message every one second, every two seconds, every four seconds, every eight seconds, or at any time interval.

Time-to-live (TTL) value 1107 is a limitation on the amount of time or number of iterations that may occur before a data packet is discarded. Each data packet sent by client 1102 to wireless access point 1100 may have an associated TTL value 1107. This enables client 1102 to control its intended communication range. In other words, client 1102 can control its communication range based on the whether a data package is received within the associated time-to-live. The exchange of data packages between client 1102 and wireless access point 1100 to control the communication range may be referred to as range checking data exchange.

Likewise, during range checking data exchange, each data packet sent by wireless access point 1100 to client 1102 may also have a TTL value. Thus, if client 1102 sends a request for access to the wireless network in data packet 1103 to wireless access point 1100, wireless access point 1100 will discard or disregard the requested data packet 1103 if it is received by wireless access point 1100 after the TTL has expired. Likewise, if client 1102 receives data packet 1103 from wireless access point 1100 after a TTL value provided by wireless access point 1100 has expired, client 1102 will discard or disregard data packet 1103. Thus, the range in which client 1102 can obtain open access to wireless access point 1100 can be controlled by providing a TTL value that corresponds to a user selected access range. In other words, if a user selects an open access range of ten feet (10 ft) from a wireless access point, a TTL value 1107 that expires within an amount of time for a data packet to travel eleven feet (11 ft) can be selected. The TTL value 1107 of eleven feet (11 ft) would prevent any client device requesting access to the network from outside the user selected access range having a radius of ten feet (10 ft) from obtaining access to the network because the selected TTL value 1107 would expire before data sent by wireless access point 1100 to client 1102 was received. Therefore, client 1102 would disregard any data packet 1103 received from wireless access point 1100 and wireless access point 1100 would disregard any data packet 1103 received by client 1102 until client 1102 moved into the user selected access range.

TTL value 1107 can be measured in any unit of time, such as seconds, milliseconds, nanoseconds, or any other unit of time. In this example, TTL value 1107 is measured in nanoseconds to allow for greater precision in timing data. TTL value 1107 is stored on data storage 1108. Data storage 1108 is a data storage device for storing data, such as storage 108 in FIG. 1. Data storage 1108 can include, but is not limited to, a hard disk, a main memory, a flash memory, a floppy disk, a compact disk (CD), a compact disk re-writable (CD-RW), a read only memory (ROM), a random access memory (RAM), a non-volatile random access memory(NVRAM), or any other known or available data storage device. Data storage 1108 may be located locally or remotely to wireless access point 1100.

TTL controller 1109 is a software component for determining a distance between wireless access point 1100 and client 1102 based on timing data provided by timer 1105 and timer 1106 and TTL value 1107. TTL controller 1109 determines whether to grant access to client 1102 based on the distance of client 1102 from wireless access point 1100. In other words, TTL controller 1109 identifies the distance of client 1102 from wireless access point 1100 to form a client distance. TTL controller 1109 then makes a determination as to whether the client distance is within a user selected open access range. In other words, even if client 1102 is within the actual access point range of wireless access point 1100, TTL controller 1109 will only grant open access to client 1102 if client 1102 is also within a user selected access range, such as actual access point range 1004 in FIG. 10.

Calibration unit 1110 is a software component for setting a user selected access range that is less than an actual access range. The actual access range is the actual range within which wireless access point 1100 can recognize client 1102 and provide access to a wireless network. In other words, the actual access range may be a maximum access range for wireless access point 1100. The user selected open access range is a range that is equal to or less than the actual access point range generated by wireless access point 1100. In this example, the user selected access range is an access range selected by the user that is more restrictive and limited than the actual range provided by wireless access point 1100. The user selected access range covers a smaller area then the actual access range.

Calibration unit 1110 is set to a calibration mode. A user selects the access range by walking around the perimeter of the selected access range area of the wireless access point with a mobile client computing device, such as a PDA. As the user walks around the perimeter, the user sends data packet 1103 with timing data to wireless access point 1100. In response, wireless access point 1100 sends data packet 1103 with a given TTL value 1107 to a mobile client computing device. If the mobile client computing device receives data packet 1103 within the TTL amount of time, the mobile computing device sends a response data packet to wireless access point 1100.

In response to receiving the response data packet, calibration unit 1110 identifies the given TTL value as a TTL value that is greater than or equal to a desired TTL value. If the mobile client computing device receives the data packet after the TTL amount of time has expired, the mobile client computing device does not send a response data packet. If calibration unit 1110 does not receive a response data packet, calibration unit 1110 identifies the given TTL value as a TTL value that is too low. The calibration unit will then send another data packet with a TTL value that is greater than the previous TTL value. In this manner, calibration unit 1110 continues sending and receiving data packets with progressively greater TTL values until calibration unit 1110 selects a TTL value corresponding to the user selected access range.

In other words, calibration client is located at a calibration point. The calibration client is a computing device that is used to calibrate the wireless access point. The calibration client should be taken to a calibration point to calibrate the wireless access point. The calibration client identifies one or more TTL values, such as TTL value 1107, at this calibration point.

The user may then move to a different calibration point and identify one or more additional TTL values at the new calibration point. For example, a user may use a calibration client to identify TTL values at the four corners of a store. The TTL values identified and collected at the two or more different calibration points form a set of desired TTL values. The calibration client selects the largest TTL value from the set of desired TTL values to ensure that all of the calibration points fall within the selected access range. In other words, if the set of two or more calibration points are the points at the four corners of a store, selecting the largest TTL value from the set of desired TTL values will ensure that all four corners of the store are within the selected access range.

However, in another embodiment, the smallest TTL value may be selected from the set of desired TTL values to ensure that the selected access range falls completely within the owners property. In other words, the smallest TTL value will minimize or eliminate any overlap of the selected access range with adjacent properties. However, using the smallest TTL value may cause one or more of the calibration points to fall outside the selected access range. Thus, in accordance with the illustrative embodiment, any TTL value may be selected from the set of desired TTL values. However, selecting the largest TTL value may allow all the calibration points in the set of calibration points to fall within the selected access range.

In another embodiment, rather than walking the perimeter of the desired access range area and sending data packets 1103 to wireless access point 1110 at two or more calibration points, a user only performs a calibration from one calibration point. In this example, if a user wants an access range with a ten foot radius, the user moves to a location ten feet (10 ft) from wireless access point 1100. The user sends a calibration data packet 1103 including a time the data packet 1103 was sent to wireless access point 1100. Calibration unit 1110 calibrates user selected access range based on the time it takes the calibration data packet 1103 to reach wireless access point 1100 to identify the user selected access range. The time it takes the calibration data packet 1103 to reach wireless access point 1100 is the difference between a transmit time when the data packet 1103 was sent by client 1102 and a receive time when the data packet 1103 was received by wireless access point 1100. The amount of time for the calibration data packet 1103 to reach wireless access point 1100 is saved in data storage 1108 as TTL value 1107.

In one embodiment, rather than using calibration unit 1110 to identify TTL value 1107, a user can enter a TTL value or a user selected access range directly into wireless access point 1100 through interface 1112 to form TTL value 1107. Interface 1112 may be any type of known or available user interface for providing input to wireless access point 1100 or receiving output from wireless access point 1100, including but not limited to, a graphical user interface (GUI), a menu-driven interface, and/or a command line interface.

Network adapter 1116 is a device for allowing client 1102 to obtain access to a network, such as network adapter 900 in FIG. 9.

Thus, in this example, network adapter 1116 of client 1102 sends data 1103 to wireless access point 1100 to request access to a wireless network. Timer 1106 of client includes a precise time that data 1103 is transmitted to wireless access point 1100 to form a transmit time. Timer 1105 of wireless access point 1100 identifies a precise time that data 1103 is received by wireless access point 1100 to form a receive time. TTL controller 1109 identifies a distance from client 1102 to wireless access point 1100 based on the transmit time and receive time. Thus, distance is determined based on transmit times and receive times for data packages exchanged during a range checking data exchange.

Then, TTL controller 1109 makes a determination as to whether the identified distance to client 1102 is within the user selected access range by comparing the difference between the send time and the receive time with TTL value 1107. If the difference between the send time and the receive time is greater than TTL value 1107, then the distance is outside the user selected access range. If the difference between the send time and the receive time is less than or equal to the TTL value, then the distance is within the user selected access range and a wireless access point 1100 grants client 1102 access. However, if the identified distance is outside of the user selected access range, TTL controller 1109 discards data 1103 and no network connection is made with client 1102.

In the example in FIG. 11, a user has selected a user selected access range. However, in another embodiment, if a user has not selected a user selected access range, a default access range is used for the user access range.

In another illustrative embodiment, two or more wireless access points are installed at the same physical location or within close proximity to the same physical location. In this example, each wireless access point can provide a different user selected access range. For example, wireless access point #1 can service a distance range from zero (0) to twenty-five feet (25 ft) from itself. Wireless access point #2 can service a distance range of less than twenty feet (20 ft) from itself. In this case, a wireless adapter that can see or detect two or more wireless access points can use the distance data provided by the receive time and transmit time for a data packet to determine which wireless access point is the closest or least distant from the wireless adapter. The client establishes a network connection through the wireless access point that is the least distant or closest because the client can generally obtain a stronger connection or network signal from the wireless access point that is located the closest to the wireless adapter.

For example, if a wireless adapter sees two wireless access points, wireless access point #1 which is five (5) feet away and wireless access point #2 which is fifty (50) feet away, the wireless adapter sorts the available wireless access points by distance. The wireless adapter then attempts to connect with each wireless access point on the list in order from the nearest in distance to the farthest until a connection is made. In this manner, a connection with the strongest connection can be obtained.

In the illustrative embodiment in FIG. 11, clocking radio wave transmissions is used to identify a distance between a wireless adapter in client 1102 and wireless access point 1100. In another embodiment, a distance between a wireless adapter in client 1102 and wireless access point 1100 is identified based on global positioning system (GPS) location. In this embodiment, a GPS transmitter is provided on the wireless adapter on client 1102 and on wireless access point 1100 for determining a GPS location. A distance between the wireless adapter and wireless access point 1100 can be determined with a very small degree of error using GPS positioning.

In this example, the range checking data exchange occurs between client 1102 and wireless access point 1100 using TCP/IP user data packets. In this example, wireless access point 1100 keeps the data lock open so that TCP/IP packets flow. Data packet 1103 is an example of a TCP/IP data packet. However, the range checking data exchange is not required to occur within TCP/IP user data packets. In accordance with the illustrative embodiments, the range checking could periodically happen in separate private radio communications between client 1102 and wireless access point 1100. For example, the range checking could occur using a private, proprietary radio communication.

Figure 12:
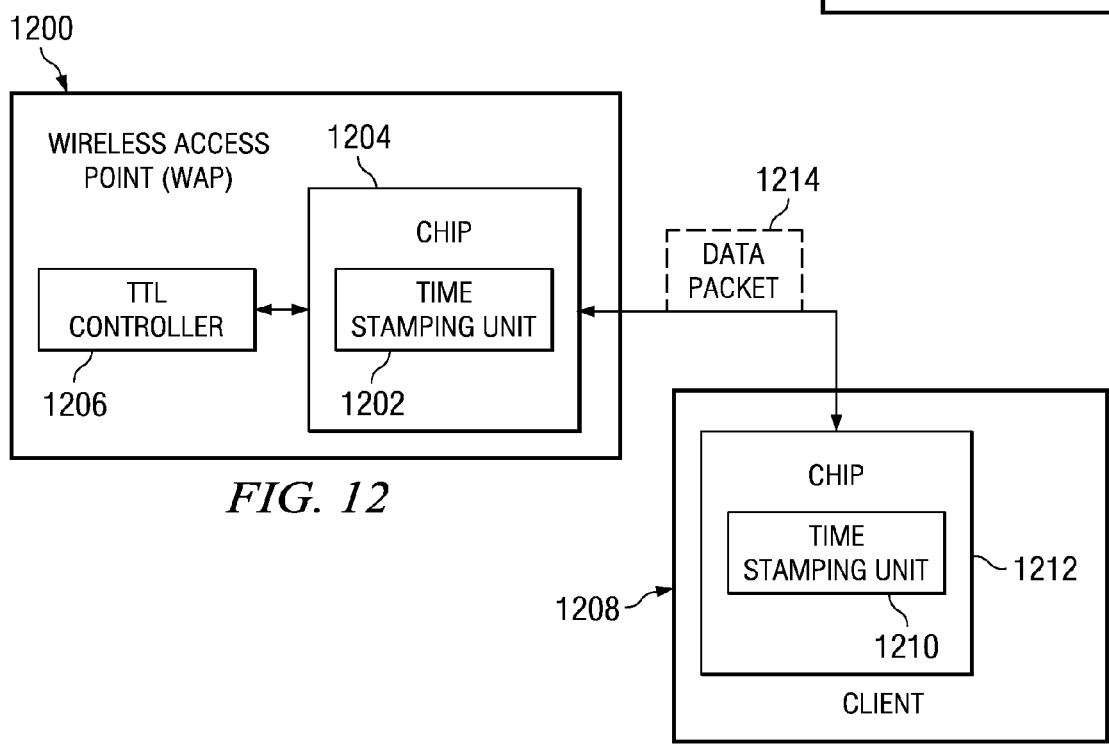
FIG. 12 is a time stamping unit for nanosecond precision timing in accordance with an illustrative embodiment.

Turning now to FIG. 12, a time stamping unit for nanosecond precision timing is shown in accordance with an illustrative embodiment. Wireless access point 1200 is a wireless access point, such as wireless access point 1100 in FIG. 11. Wireless access point 1200 includes time stamping unit (TSU) 1202. Time stamping unit 1202 is a hardware component located on chip 1204 on an Ethernet card. Chip 1204 is a dedicated Ethernet chip on wireless access point 1200.

Time stamping unit 1202 is located between the Ethernet media access control (MAC) and the Ethernet PHY transceiver to sniff outbound and inbound data packets. When a data packet is identified, time stamping unit 1202 latches the time in hardware. This provides the ability to precisely measure the arrival or departure time of data packets. Time stamping unit 1202 provides precise transmit and receive times for data packets to TTL controller 1206. TTL controller 1206 is a software component for controlling wireless access range, such as TTL controller 1109.

Time stamping unit 1202 utilizes precise time protocol (PTP) to deliver nanosecond-level precise time accuracy over a standard network connection. In this illustrative example, time stamping unit 1202 uses IEEE-1588 PTP. IEEE-1588 PTP is a hardware-assisted time stamping that provides a technique for exchanging precision time stamps between wireless access point 1200 and client 1208.

Client 1208 is a client computing device, such as client 1102 in FIG. 11. Client 1208 also includes time stamping unit 1210 on chip 1212. Time stamping unit 1210 is a hardware time stamping unit, such as time stamping unit 1202.

Thus, in accordance with this illustrative example, wireless access point 1200 sends data packet 1214 to client 1208. Data packet 1214 includes a nanosecond-level precise send time indicating the precise time when wireless access point 1200 transmitted data packet 1214. Client 1208 receives data packet 1214. Time stamping unit 1210 records a nanosecond-level precise receive time indicating the precise time when client 1208 received data packet 1214. Data packet 1214 includes a time-to-live value. If the difference between the receive time and the send time is not less than or equal to the time-to-live value, data packet 1214 is discarded by client 1208. Thus, client 1208 does not receive access to the network. However, if the difference between the send time and the receive time is less than the time-to-live, then client 1208 is within the user selected access range. In this case, data packet 1214 is not discarded and client 1208 is able to connect and obtain access to the network.

In another embodiment, a wireless adapter may not have a high resolution timer or time stamping unit to measure radio wave distance to an access point. In this situation, the wireless access point denies open access to the client without a high resolution timer, a time stamping unit, or a global positioning system receiver. However, the wireless access point may still allow the client to access the network by logging in and authenticating the user. A user can be authenticated by a user name and password, or any other means for authenticating a client and/or user.

Figure 13:
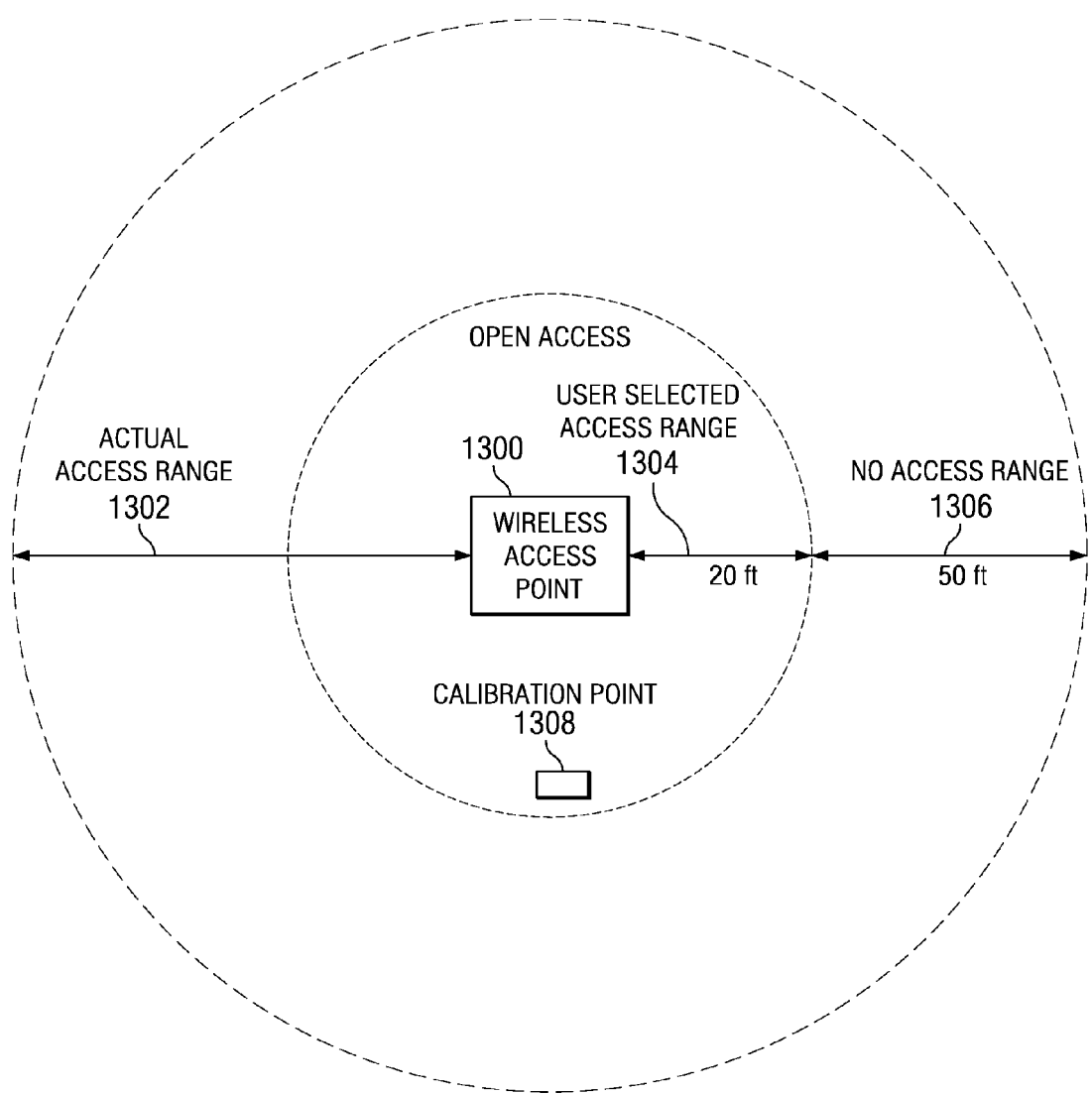
FIG. 13 is a block diagram illustrating a user selected access range in accordance with an illustrative embodiment.

Turning now to FIG. 13, a block diagram illustrating a user selected access range is depicted in accordance with an illustrative embodiment. Wireless access point 1300 is a wireless access point, such as wireless access point 1100 in FIG. 11 and wireless access point 1200 in FIG. 12. Wireless access point 1300 has actual access range 1302. Actual access range 1302 is the effective access range within which a client can recognize and access wireless access point 1300 if no other constraints were in place.

User selected access range 1304 is the selected access range within which a client can access a wireless network through wireless access point 1300. If a client device is located outside user selected access range 1304 but within actual access range 1302, the client will not be granted access to the network because the client is outside user selected access range 1304. In other words, if a client is within no access range 1306, the client will not be granted access to connect to the wireless network through wireless access point 1300 even though the client is within actual access range 1302. No access range 1306 is the range outside user selected access range 1304 but inside actual access range 1302.

User selected access range 1304 is set or adjusted by a user. A user sets selected access range 1304 by calibrating the wireless access range at calibration point 1308. Calibration point 1308 is a location on a perimeter of user selected access range 1304.

To set user selected access range 1304, a user sends a calibration data packet to wireless access point 1300 from a mobile computing device. Wireless access point 1300 responds by sending a calibration data packet back to the client with a time-to-live value. If the mobile computing device receives the data packet within the time-to-live, then the time-to-live value is greater than or equal to a desired time-to-live value for user selected access range 1304.

This process is repeated until a lowest time-to-live value is selected to form a selected time-to-live value that enables a data packet sent by wireless access point 1300 to be received by a mobile computing device located at calibration point 1308 within the selected time-to-live value. Thus, a client computing device located outside user selected access range 1304 at a distance greater than the distance between wireless access point 1300 and calibration point 1308 will not be received by a client device in an amount of time less than or equal to the selected time-to-live value. Therefore, a client device located outside user selected access range 1304 will not be able to obtain access to the network through wireless access point 1300.

In this example, user selected access range 1304 is an open access range in which any client device can connect to the network without any authentication or security. However, in another embodiment, user selected access range 1304 requires a client authentication to connect to the network.

In yet another embodiment, a client device must satisfy both the access range restriction and a client authentication restriction to connect to the network. In other words, a client device must be within the selected access range to connect to the network. In addition, the client device must also be authenticated to connect to the network. In this example, if a client device is outside the selected access range or is within the selected access range and fails to be properly authenticated, the client device is not granted access to the network.

The user can change the size of user selected access range 1304 by moving to a new location within actual access range and performing a calibration process, as described above. This new location forms a new calibration point. The new calibration point in this example, is a point along a perimeter of a new user selected access range. Thus, a user can increase or decrease the user selected access range by calibrating the selected access range at different calibration points.

Figure 14:
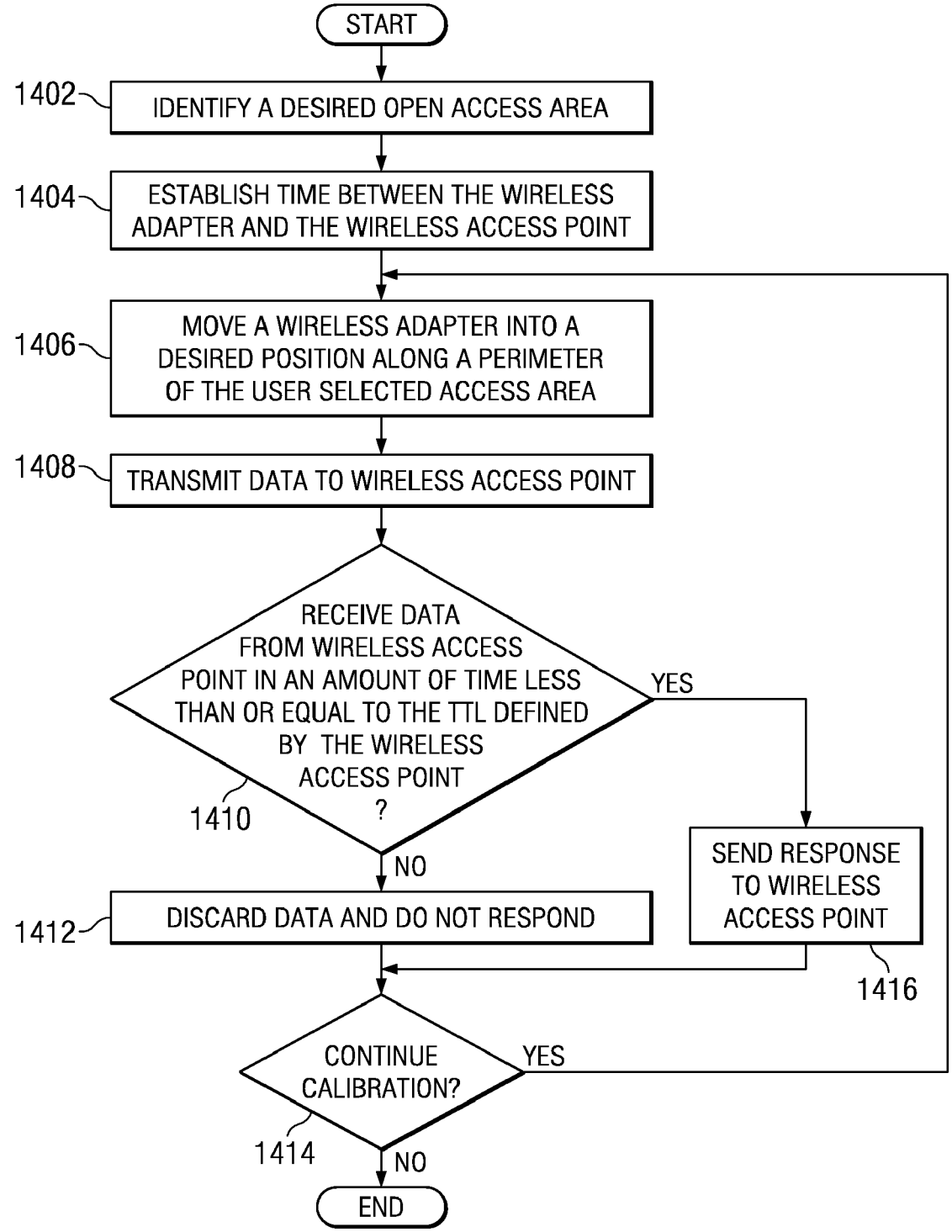
FIG. 14 is a flowchart illustrating a process for calibrating a user selected access range in accordance with an illustrative embodiment.

FIG. 14 is a flowchart illustrating a process for calibrating a user selected access range in accordance with an illustrative embodiment. In this illustrative example shown in FIG. 14, the process is performed by a user with a mobile computing device, such as client 1102 in FIG. 11.

The process begins by identifying a desired open access area (step 1402). A user identifies a desired open access area by locating a spot that is on the outermost boundary or perimeter of an area that the user wants to have wireless network access. This position or location is referred to as the calibration point. The process establishes a precise nanosecond-level transmission time between the wireless adapter on the client and the wireless access point (step 1404).

The process moves a wireless adapter on the client device into a desired position along a perimeter of the user selected access area (step 1406). The desired position is the calibration point. The process transmits data to the wireless access point (step 1408) from the calibration point.

Next, the process makes a determination as to whether data is received from the wireless access point in an amount of time that is less than or equal to the time-to-live (TTL) defined by the wireless access point (step 1410). If the data from the wireless access point is not received in an amount of time less than or equal to the TTL value, the process discards the data and does not send a response to the wireless access point (step 1412).

The process makes a determination as to whether to continue the calibration process (step 1414). If a determination is made to continue the calibration, the process returns to step 1406 and continues iteratively performing steps 1406-1414 until a determination is made to stop calibration.

Returning to step 1410, if the data is received from the wireless access point within the time-to-live value, the process sends a response to the wireless access point (step 1416). The response tells the wireless access point that the time-to-live value is greater than or equal to a desired time-to-live value. Thus, if a user chooses to continue calibration at step 1414, the wireless access point can send a data packet with a time-to-live value that is less than the previous time-to-live value in an attempt to fine-tune or adjust the time-to-live value. The process will continue to adjust the time-to-live value to identify the lowest possible value that still allows a client at the calibration point to receive data packets from the wireless access point within the time-to-live.

Figure 15:
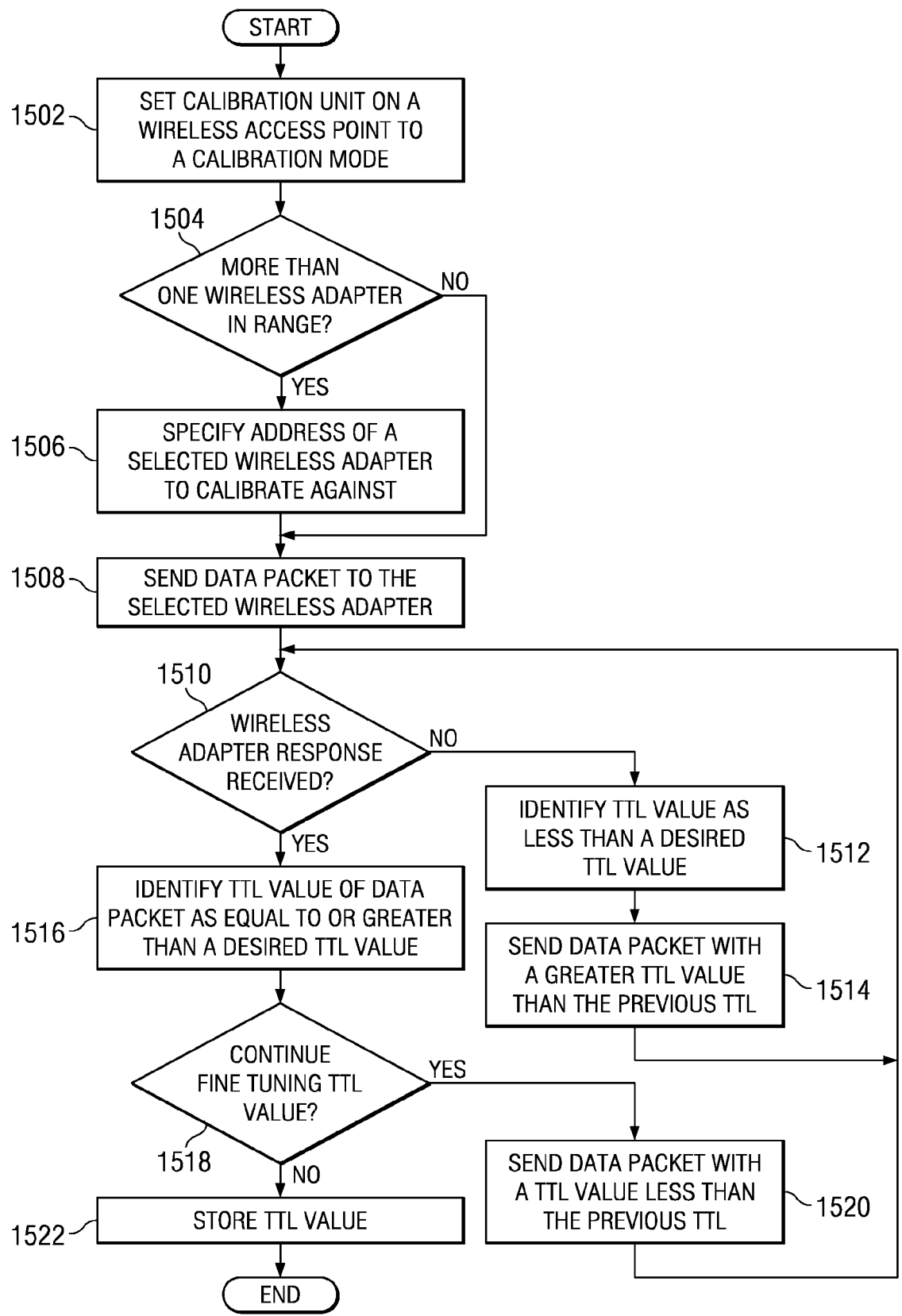
FIG. 15 is a flowchart illustrating a process for identifying a time-to-live value for a user selected access range in accordance with an illustrative embodiment.

Referring now to FIG. 15, a flowchart illustrating a process for identifying a time-to-live value for a user selected access range is shown in accordance with an illustrative embodiment. In this illustrative example shown in FIG. 15, the process is performed by a software component for calibrating a time-to-live value, such as calibration unit 1110 in FIG. 11.

The process begins when a user sets a calibration unit on a wireless access point to a calibration mode (step 1502). The calibration unit makes a determination as to whether more than one wireless adapter on a client device is in range (step 1504). If more than one adapter is in range, the calibration unit specifies an address of a selected wireless adapter to calibrate against (step 1506). In other words, if more than one client device having a wireless adapter is in range, a user can specify a unique identifier of the desired client device to select a client device for use in the calibration process. For example, a user may select the wireless adapter to calibrate against by entering an address of the client device and/or wireless adapter on the client device. An address of a client device may include a media access control (MAC) address.

The calibration unit sends a data packet to the selected wireless adapter (step 1508). The calibration unit makes a determination as to whether a response is received from the selected wireless adapter (step 1510).

If a response is not received, the calibration unit identifies the time-to-live value used in the data packet sent to the selected wireless adapter as a time-to-live value that is less than a desired time-to-live value (step 1512). The calibration unit then sends a data packet with a greater or longer time-to-live value than the previous time-to-live value to the wireless adapter (step 1514). The process returns to step 1510 and iteratively repeats steps 1510-1514 until a response is received from the wireless adapter.

When the calibration unit receives a response from the wireless adapter, the calibration unit identifies the time-to-live value as equal to or greater than a desired time-to-live value (step 1516). The process then makes a determination as to whether to continue fine tuning the time-to-live value (step 1518). If the calibration unit continues fine tuning the time-to-live value, the calibration unit sends another data packet to the wireless device with a time-to-live value that is less than the previous time-to-live value (step 1520). The calibration unit continues performing steps 1510-1520 until the calibration unit makes a determination to stop fine tuning the time-to-live value at step 1518. Next, the process stores the time-to-live value in a data storage, such as data storage 1108 in FIG. 11 (step 1522) with the process terminating thereafter.

Figure 16:
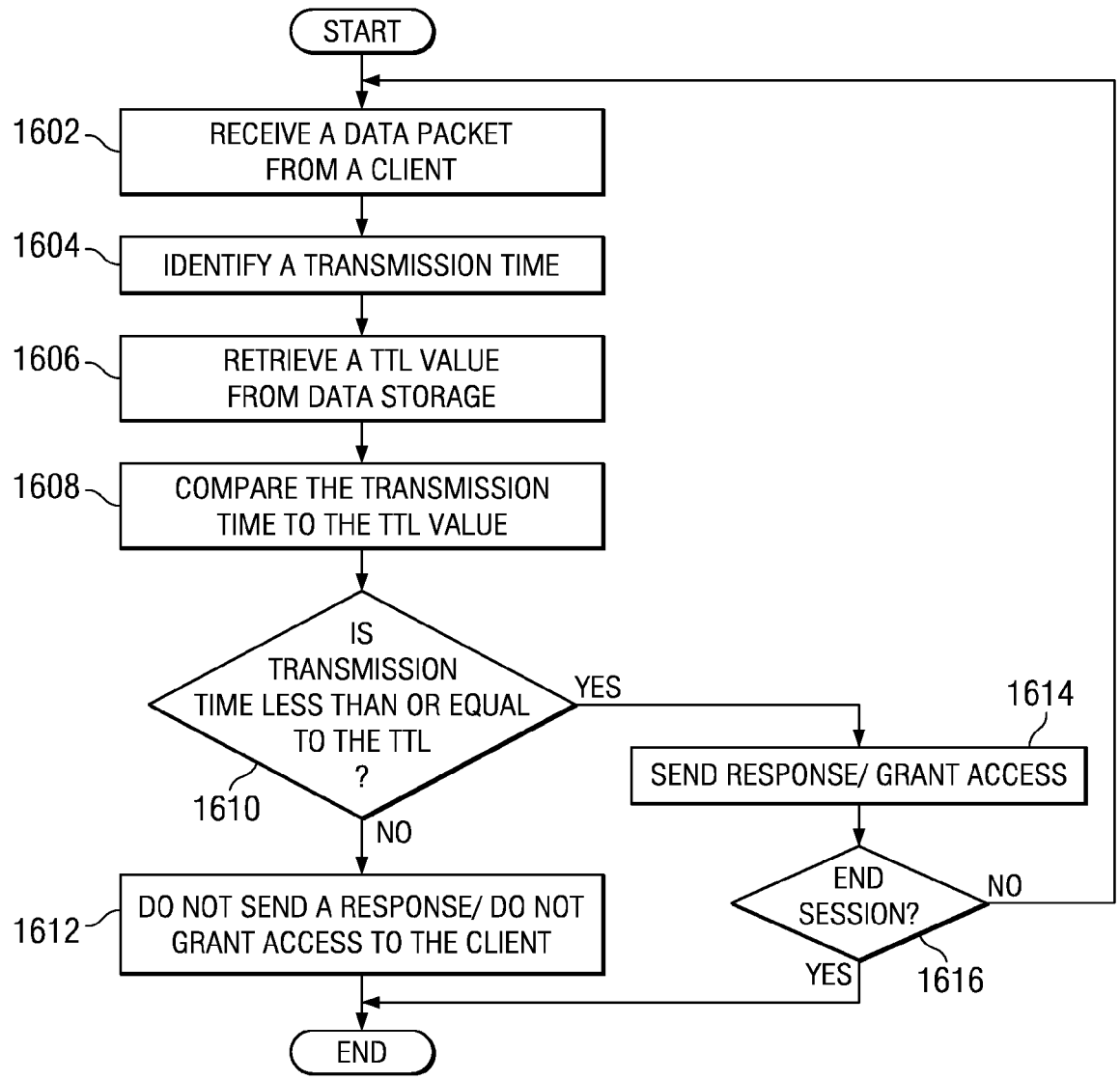
FIG. 16 is a flowchart illustrating a process for determining whether a client is within a user selected access range in accordance with an illustrative embodiment.

FIG. 16 is a flowchart illustrating a process for determining whether a client is within a user selected access range in accordance with an illustrative embodiment. In this illustrative example shown in FIG. 16, the process is performed by a software component for determining whether a client is within a user selected access range, such as TTL controller 1109 in FIG. 11.

The process begins by receiving a data packet from a client (step 1602). The process identifies a transmission time (step 1604) based on the transmit time when the data packet was sent by the client and a receive time when the data packet was received by the wireless access point. The process retrieves a time-to-live value from data storage (step 1606). The process compares transmission time to the time-to-live value (step 1608). The transmission time is an amount of time to transmit the data packet from the client to the wireless access point. The transmission time can be determined by identifying a difference between a receive time and a transmit time for the data packet.

Next, the process makes a determination as to whether the transmission time is less than or equal to the time-to-live value (step 1610). If the transmission time is greater than the time-to-live value, the process does not send a response to the client and/or does not grant network access to the client (Step 1612) with the process terminating thereafter.

Returning to step 1610, if the transmission time is less than or equal to the time-to-live value, the process sends a response to the client and/or grants network access to the client (step 1614). The process makes a determination as to whether to end the client's session (step 1616). If the process does not end the session, the process continues to perform steps 1602-1614 to ensure that the client does not move out of the user selected access range. If the process makes a determination to end the session at step 1616, the process terminates thereafter.

The illustrative embodiments provide a computer implemented method, apparatus, and computer usable program code for controlling a wireless access point range. In one embodiment, the process identifies a user selected access range of a wireless access point. The process receives a data packet from a client. The data packet includes a time that the data packet was transmitted. Next, the process identifies a distance from the client to the wireless access point based on the time the data packet was sent and a time the data packet was received by the wireless access point. The process grants the client access to a wireless network if the distance from the client to the wireless access point is within the user selected access range.

Thus, the illustrative embodiments allow an owner or operator of a wireless access point to control a range of the open wireless access by setting a user selected access range that is less than or equal to the actual access range. In this manner, a user can prevent users in adjacent properties from using the wireless access point to access a network, such as the Internet. This also prevents users on property within the actual access range from using network bandwidth if the users are outside a user selected distance from the wireless access point. Thus, the illustrative embodiments allow a user to control wireless access range in a user selected manner.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in a combination of hardware and software. The IEEE chip is a hardware device that allows the process to perform nanosecond sync/timestamps to determine a distance between a client device and a wireless access point.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing access to a wireless access point, the computer implemented method comprising:
    receiving a data packet requesting access to a network at the wireless access point from a client device within an actual access range of the wireless access point;
    identifying a distance between the client device and the wireless access point based on the data packet received;
    responsive to the distance between the client device and the wireless access point being within a selected access range for the wireless access point, transmitting the data packet from the wireless access point to the network;
    responsive to the distance between the client device and the wireless access point being beyond the selected access range for the wireless access point, denying the data packet access to the network;
    sending a data packet to a calibration client; and
    responsive to receiving a reply data packet from the calibration client, identifying the selected access range for the wireless access point based on a difference between a time the data packet was sent to the calibration client and a time the reply data packet was received from the calibration client.

2. The computer implemented method of claim 1 further comprising:
    identifying the selected access range for the wireless access point;
    receiving the data packet from the client device, wherein the data packet includes a time that the data packet was transmitted to form a transmit clock time; and
    identifying an amount of time to transmit the data packet based on a difference between the transmit clock time and a receive time, wherein the receive time is a clock time when a data packet is received.

3. The computer implemented method of claim 2 wherein identifying the distance from the client to the wireless access point based on the transmit time further comprises:
    responsive to determining that an amount of time to transmit the data packet from the wireless access point to the client is less than or equal to a time-to-live value, identifying the distance from the client to the wireless access point as a distance within the user selected access range.

4. The computer implemented method of claim 1 wherein the selected access range is less than an actual wireless access range for the wireless access point.

5. The computer implemented method of claim 2 wherein identifying the selected access range further comprises:
    sending a data packet to a calibration client with a given time-to-live value; and
    responsive to receiving a reply data packet from the calibration client, identifying the given time-to-live value as a time-to-live value that is greater than or equal to a desired time-to-live value, wherein the desired time-to-live value defines the selected access range.

6. The computer implemented method of claim 5 further comprising:
    responsive to determining that a reply data packet from the calibration client was not received, sending another data packet to the calibration client with a larger time-to-live.

7. The computer implemented method of claim 2 further comprising:
    identifying, by a time stamping unit on an Ethernet card, the receive time, wherein the receive time is a clock time in nanoseconds when a data packet is received.

8. The computer implemented method of claim 1 further comprising:
    detecting a set of two or more wireless access points;
    transmitting a data packet from the client device to each wireless access point;
    identifying a distance between the client and each wireless access point based on an amount of time for the data packet to be transmitted between the client device and each wireless access point; and
    sending a request to access a wireless access point in the set of two or more wireless access points that is located at a shortest distance from the client device.

9. A computer program product comprising:
    a computer usable storage device including computer usable program code for managing access to a wireless access point, the computer program product comprising:
        computer usable program code for identifying a distance between a client device and the wireless access point based on a data packet received in response to receiving the data packet requesting access to a network at the wireless access point from the client device within an actual access range of the wireless access point;
        computer usable program code for transmitting the data packet from the wireless access point to the network in response to the distance between the client device and the wireless access point being within a selected access range for the wireless access point;
        computer usable program code for denying the data packet access to the network in response to the distance between the client device and the wireless access point being beyond the selected access range for the wireless access point;
        computer usable program code for sending a data packet to a calibration client; and
        computer usable program code for identifying the selected access range for the wireless access point based on a difference between a time the data packet was sent to the calibration client and a time a reply data packet was received from the calibration client in response to receiving the reply data packet from the calibration client.

10. The method of claim 1, wherein the data packet includes a time that the data packet was transmitted and wherein identifying the distance between the client device and the wireless access point comprises:
  identifying the distance based on a difference between the time the data packet was transmitted and a time the data packet was received at the wireless access point.

11. The computer program product of claim 9, wherein the data packet includes a time that the data packet was transmitted and wherein the computer usable program code for identifying the distance between the client device and the wireless access point comprises computer usable program code for identifying the distance based on a difference between the time the data packet was transmitted and a time the data packet was received at the wireless access point.

\* \* \* \* \*